United States Patent
Chino et al.

(10) Patent No.: US 8,963,970 B2
(45) Date of Patent: Feb. 24, 2015

(54) IMAGE FORMING APPARATUS EQUIPPED WITH LASER LIGHT SOURCE

(75) Inventors: Noriyuki Chino, Kawasaki (JP); Katsuhiko Takano, Yokohama (JP); Masaaki Naoi, Yokosuka (JP); Shingo Horita, Kawasaki (JP); Takeshi Uchida, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 113 days.

(21) Appl. No.: 13/523,340

(22) Filed: Jun. 14, 2012

(65) Prior Publication Data

US 2013/0002790 A1    Jan. 3, 2013

(30) Foreign Application Priority Data

Jun. 28, 2011  (JP) ................. 2011-142801

(51) Int. Cl.
- *B41J 2/385* (2006.01)
- *B41J 2/435* (2006.01)
- *G02B 26/12* (2006.01)
- *G03G 15/043* (2006.01)

(52) U.S. Cl.
CPC ............ *G02B 26/127* (2013.01); *G03G 15/043* (2013.01)
USPC .......................... 347/133; 347/250

(58) Field of Classification Search
USPC .................................. 347/133, 250
See application file for complete search history.

(56) References Cited

U.S. PATENT DOCUMENTS 4,834,477 A * 5/1989 Tomita et al. ................ 372/34

FOREIGN PATENT DOCUMENTS

JP          2003-21799 A     1/2003

* cited by examiner

*Primary Examiner* — Justin Seo
*Assistant Examiner* — Kendrick Liu
(74) *Attorney, Agent, or Firm* — Fitzpatrick, Cella, Harper & Scinto

(57) ABSTRACT

An image forming apparatus improved in the accuracy of detecting a time period over which a laser beam is scanned. A laser beam emitted from a laser light source is deflected by a polygon mirror such that the laser beam scans a photosensitive drum. The deflected laser beam is guided onto the photosensitive drum via an imaging lens. A mode hop detection unit detects a mode hop of the laser beam. An image pulse generation section detects a main scanning magnification of an electrostatic latent image formed on the photosensitive drum. When a mode hop is detected, the main scanning magnification in a next scanning cycle is corrected using a correction value stored in a storage unit and used most lately, whereas when no wavelength variation has not detected, the main scanning magnification in the next scanning cycle is corrected using the latest correction value.

10 Claims, 16 Drawing Sheets

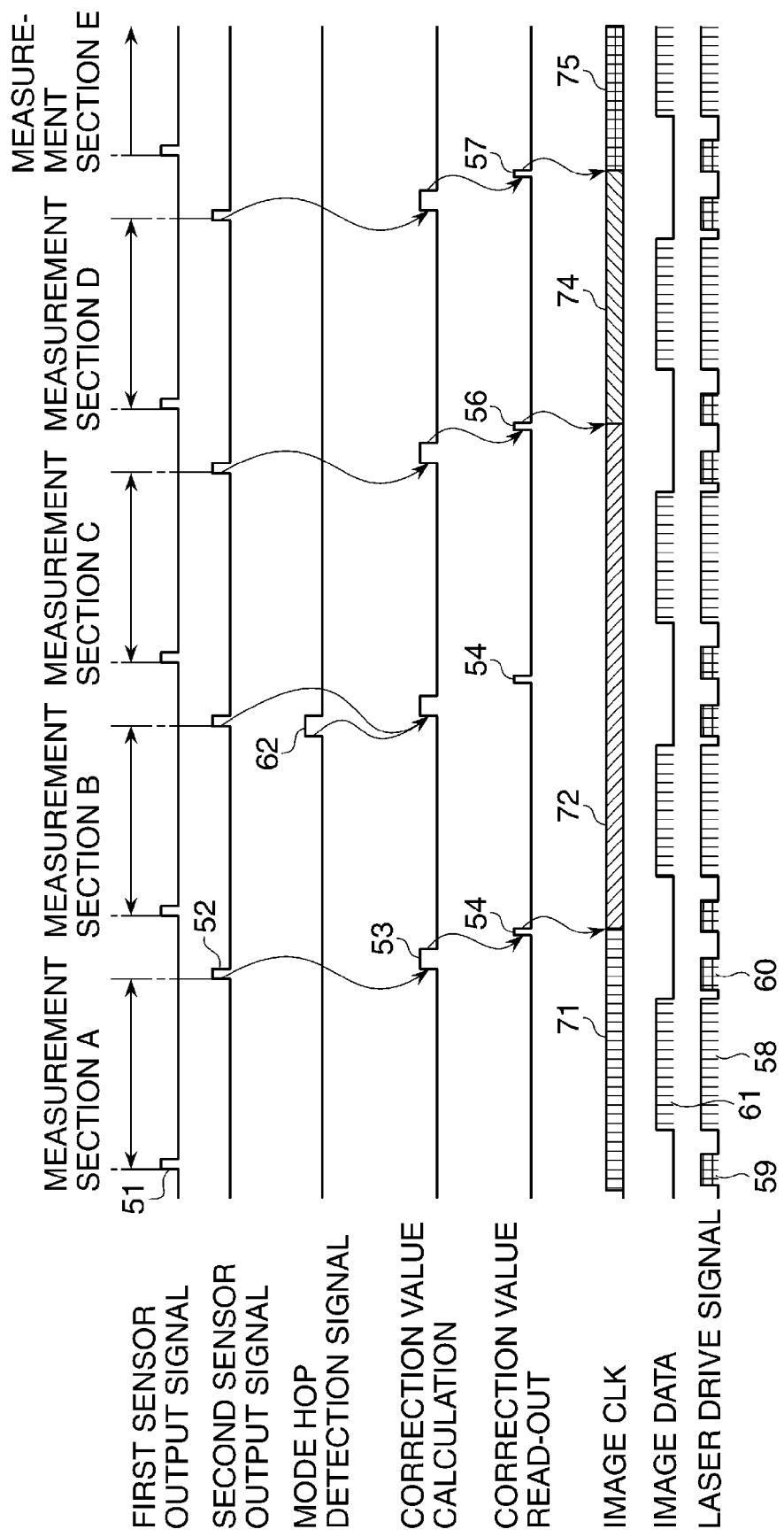

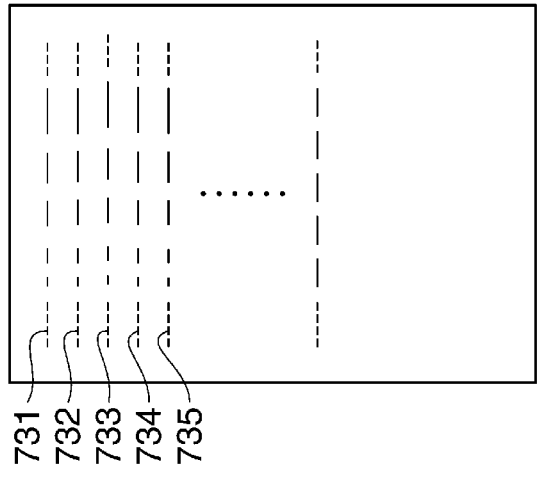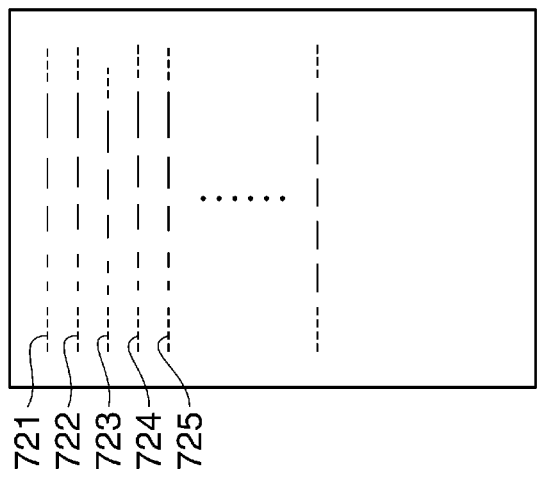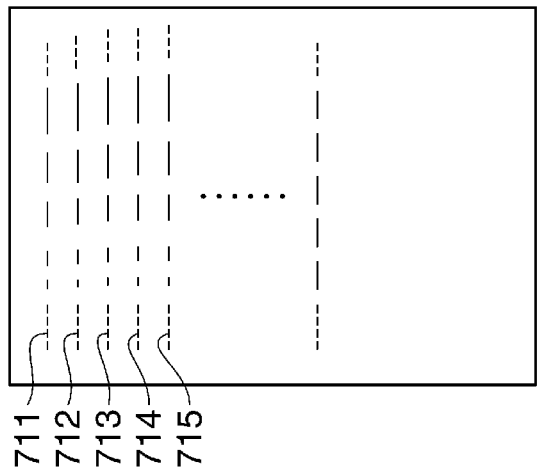

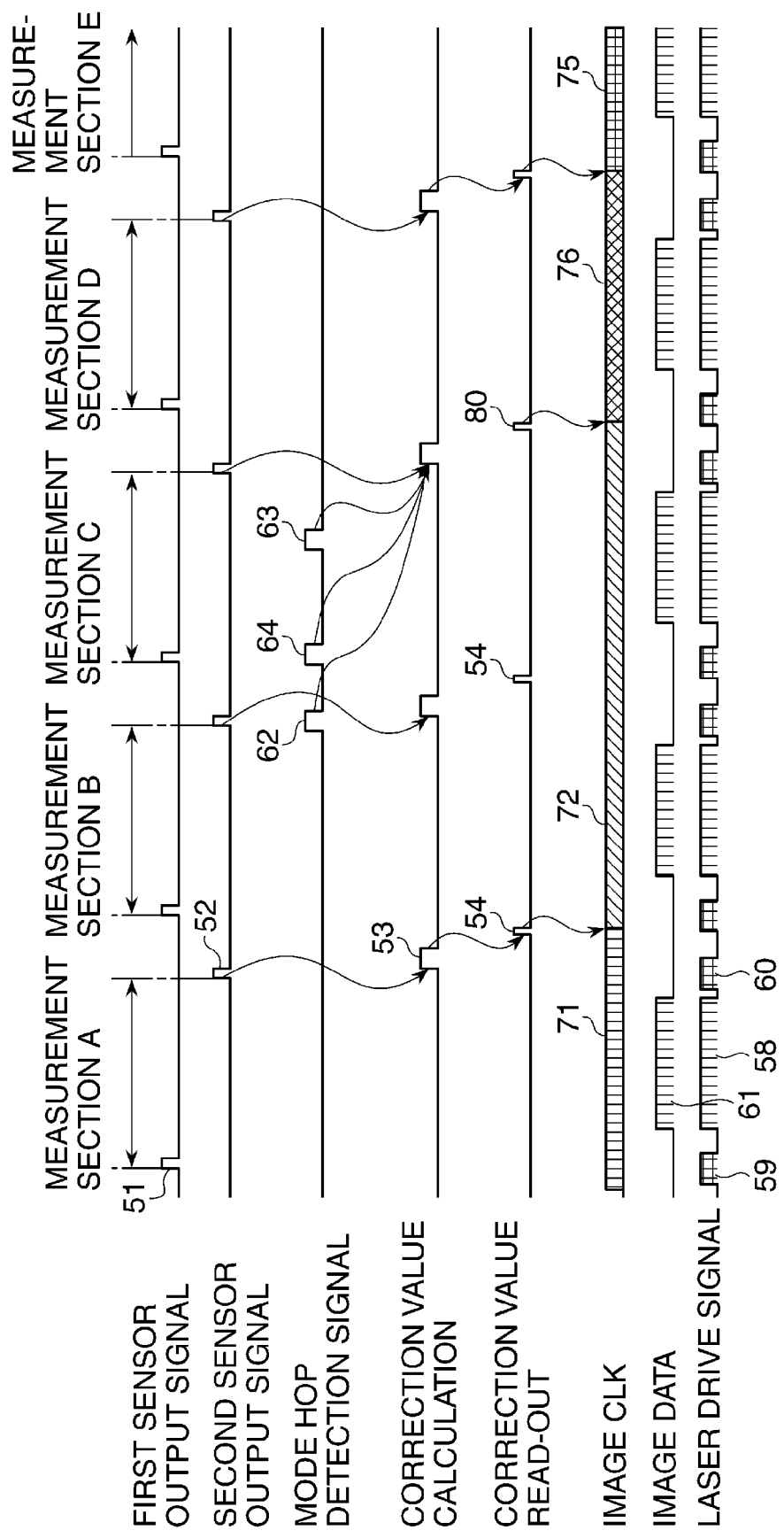

IMAGE FORMING APPARATUS EQUIPPED WITH LASER LIGHT SOURCE

BACKGROUND of the invention

1. Field of the Invention

The present invention relates to an image forming apparatus equipped with a laser light source.

2. Description of the Related Art

In an image forming apparatus that deflects a laser beam modulated based on an image signal using a rotary polygon mirror to scan on a photosensitive drum, there have been proposed various techniques for improving accuracy of the scanning position. For example, as a technique of measuring the path of a laser beam in advance for improving accuracy of the scanning position, there has been proposed a technique that corrects the scanning position on a real-time basis using sensors disposed at respective locations outside opposite ends of a photosensitive drum, for detecting the laser beam (see e.g. Japanese Patent Laid-Open Publication No. 2003-21799).

More specifically, in the technique described in Japanese Patent Laid-Open Publication No. 2003-21799, one of the sensors disposed at a location outside one end of the photosensitive drum close to an image writing start position, for detecting the laser beam, is used to adjust the image writing start timing in a main scanning direction of the laser beam to thereby adjust the image writing start position in the main scanning direction. Further, a time period over which the laser beam passes between the sensors disposed at respective locations outside the opposite ends of the photosensitive drum is measured to thereby correct scanning density in the main scanning direction.

In the technique described in Japanese Patent Laid-Open Publication No. 2003-21799, it is possible to calculate the scanning speed of a laser beam passing between the sensors from the difference in times at which the laser beam passes the sensors disposed at respective locations outside the opposite ends of the photosensitive drum. This makes it possible to correct non-uniformity in scanning density due to varying factors, such as rotational fluctuation of a polygon mirror motor, or variation in the processing accuracy of a polygon mirror surface.

However, the varying factors of scanning density are not limited to these, and further includes e.g. wavelength variation of the laser beam. A semiconductor laser chip that oscillates only a single-wavelength laser beam, a so-called single-mode laser beam, is generally used for image forming apparatuses. Therefore, the following description will be given of wavelength variation of a laser beam emitted from a semiconductor laser chip.

In the semiconductor laser chip, the wavelength varies due to a temperature change in the usage environment and a temperature change caused by self-heating. This phenomenon is called "mode hop or mode hopping". FIG. 13 is a diagram showing an example of changes in wavelength of a laser beam, due to the mode hopping phenomenon. In FIG. 13, reference numeral 101 denotes change characteristics exhibited when the temperature rises, reference numeral 102 denotes change characteristics exhibited when the temperature falls, reference numeral 103 denotes an amount of change in temperature, and reference numeral 104 denotes an amount of change in wavelength.

FIG. 13 shows an example of characteristics of a long resonator-type semiconductor laser chip, and the wavelength changes in a stepped manner at approximately fixed intervals as the temperature becomes higher. Further, it is also known that a change caused by a temperature rise (change characteristics 101) and a change caused by a temperature fall (change characteristics 102) are different from each other.

In an image forming apparatus, a laser beam passes through a plurality of optical lenses before reaching a surface of the photosensitive drum, and hence if the wavelength varies in the laser beam due to a mode hop, an irradiation angle deflects by an amount corresponding to chromatic aberration of each optical lens. Therefore, on the photosensitive drum surface, the irradiation position undergoes a sudden change at the moment of occurrence of a mode hop, and the scanning density changes before and after the change in the irradiation position, which degrades the accuracy of the scanning position. Further, if a mode hop occurs when the sensors for detecting laser beams disposed at respective locations outside opposite ends of the photosensitive drum are receiving the laser beam, to cause a sudden change in the wavelength, it is impossible to accurately measure the scanning speed. Note that it is impractical from the viewpoints of control accuracy and costs to control the temperature of a chip so as to prevent occurrence of a mode hop.

FIG. 14 is a diagram showing another example of changes in the wavelength of a laser beam due to the mode hopping phenomenon. In FIG. 14, reference numeral 105 denotes change characteristics, reference numeral 106 denotes an amount of change in temperature, and reference numeral 107 denotes an amount of change in wavelength. Note that the change characteristics 101 etc. appearing in FIG. 13 are also shown in FIG. 14, for comparison. FIG. 14 shows the characteristics of a short resonator-type semiconductor laser chip, such as a VCSEL.

When the short resonator-type semiconductor laser chip is used, compared with a case of using the long resonator type semiconductor laser chip, although an interval of occurrence of mod hopping with respect to a change in temperature becomes long, an amount of variation in wavelength when a mode hop occurs increases. Therefore, also when the short resonator type semiconductor laser chip is used, there is caused the same problem as caused when the long resonator type semiconductor laser chip is used.

SUMMARY OF THE INVENTION

The present invention provides an image forming apparatus improved in the accuracy of detection of a time period over which a laser beam is scanned.

The present invention provides an image forming apparatus that forms an image by developing an electrostatic latent image formed on a surface of a photosensitive member, comprising a laser light source configured to emit a laser beam for forming the electrostatic latent image, a scanning unit configured to deflect the laser beam such that the laser beam emitted from the laser light source scans the photosensitive member, a lens configured to guide the laser beam deflected by the scanning unit onto the photosensitive member, a detection unit configured to detect occurrence of wavelength variation of the laser beam, a magnification detection unit configured to detect a magnification of the electrostatic latent image in a direction of scanning of the laser beam on the photosensitive member, the electrostatic latent image being formed by scanning of the laser beam on the photosensitive member, and a correction unit configured, in a case where the detection unit has detected the occurrence of wavelength variation of the laser beam during a scanning cycle, to correct the magnification of the electrostatic latent in a scanning cycle next to the scanning cycle during which the occurrence of wavelength variation of the laser beam has been detected, based on correction data of the magnification of the electrostatic latent in a scanning cycle during which no occurrence of wavelength variation of the laser beam has been detected and which is previous to the scanning cycle during which the occurrence of wavelength variation of the laser beam has been detected, and, in a case where the detection unit has detected no occurrence of wavelength variation of the laser beam during a scanning cycle, to correct the magnification of the electrostatic latent in a scanning cycle next to the scanning cycle during which no occurrence of wavelength variation of the laser beam has been detected, based on correction data of the magnification of the electrostatic latent in the scanning cycle during which no occurrence of wavelength variation of the laser beam has been detected.

According to the present invention, it is possible to improve the accuracy of detection of a time period over which the laser beam is scanned. This makes it possible to obtain a high-grade image which is suppressed in the displacement of pixel positions forming an image.

Further features of the present invention will become apparent from the following description of exemplary embodiments with reference to the attached drawings.

BRIEF DESCRIPTION OF THE DRAWINGS

FIG. 5 is a timing diagram useful in explaining a main scanning magnification correction process executed by the correction calculation section shown in FIG. 4.

FIGS. 7A to 7C are views showing examples of an image formed on a sheet, in which FIG. 7A shows an image formed when main scanning magnification correction is not performed, FIG. 7B shows an image formed when main scanning magnification correction is always performed irrespective of occurrence of mod hopping, and FIG. 7C shows an image formed when the main scanning magnification correction process is executed by the image forming apparatus according to the present embodiment.

FIG. 11 is a timing diagram of a main scanning magnification correction process executed by the correction calculation section shown in FIG. 10.

DESCRIPTION OF THE EMBODIMENTS

The present invention will now be described in detail below with reference to the accompanying drawings showing embodiments thereof.

Figure 1:
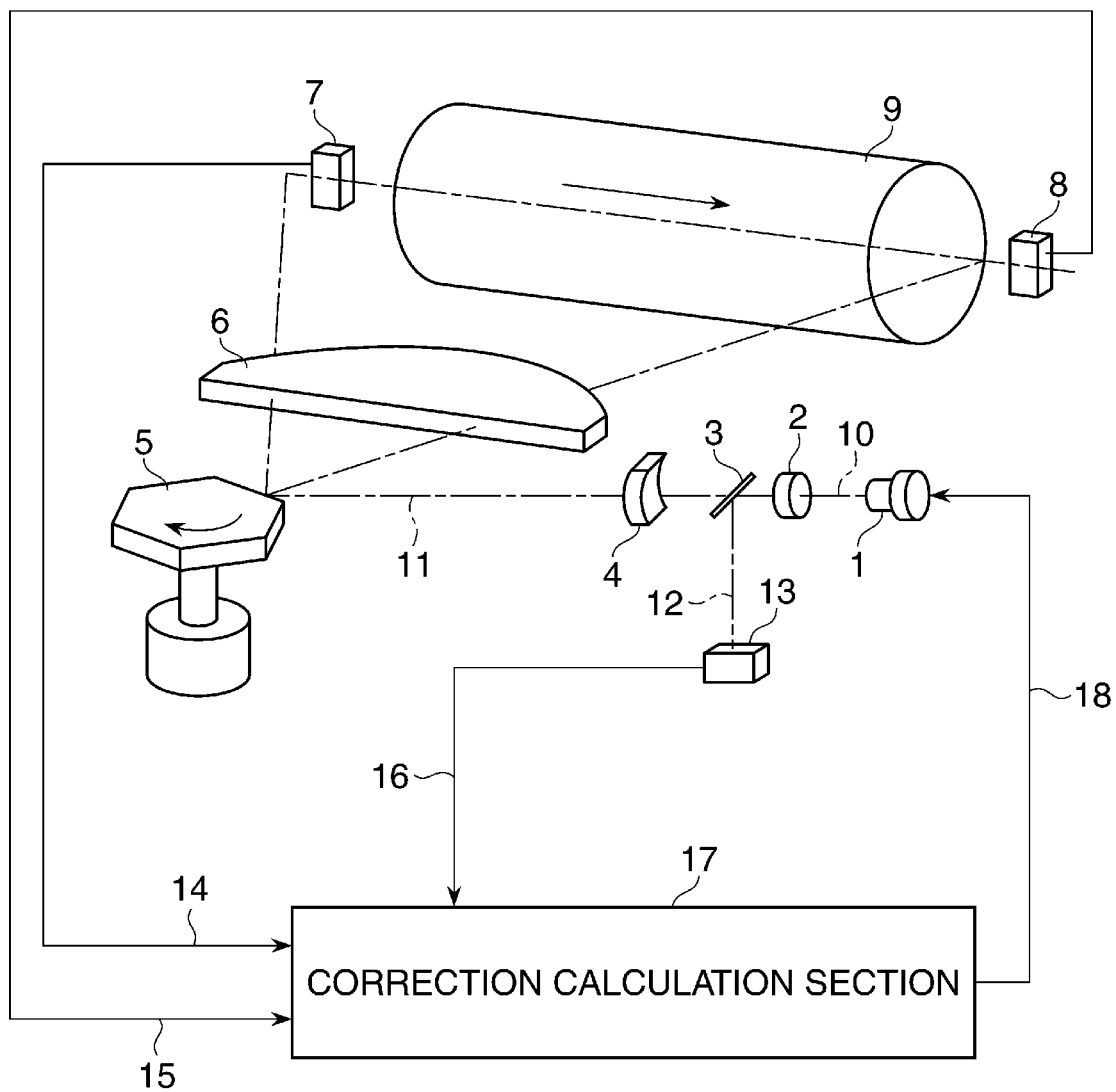
FIG. 1 is a view schematically showing the arrangement of an optical system of an image forming apparatus according to a first embodiment of the present invention and a flow of a control signal.

FIG. 1 is a view schematically showing the arrangement of an optical system of an image forming apparatus according to a first embodiment of the present invention and a flow of a control signal. The image forming apparatus includes a laser light source 1, a collimator lens 2, a half mirror 3, a cylindrical lens 4, a polygon mirror 5, an imaging lens (fθ lens) 6, two optical sensors 7 and 8, and a photosensitive drum 9 as a photosensitive member.

In the present embodiment, it is assumed that the laser light source 1 is implemented by using a semiconductor laser chip of a long resonator type or a short resonator type. The laser light source 1 is driven by a laser drive signal 18 output from a correction calculation section 17 a detailed description of which will be given hereinafter. The collimator lens 2 converts a laser beam 10 internally modulated according to image data and emitted from the laser light source 1 to a collimated laser beam (see FIG. 2).

The collimated laser beam from the collimator lens 2 passes through the half mirror 3. The laser beam, denoted by reference numeral 11, which has passed through the half mirror 3 is collected by the cylindrical lens 4 to form a linear beam spot on the polygon mirror 5, and is deflected by the polygon mirror 5. Then, after passing through the imaging lens 6, the laser beam 11 scans the surface of the photosensitive drum 9 at a uniform speed, which is uniformly charged, in a direction parallel to the main scanning direction. The photosensitive drum 9 is driven for rotation in synchronism with the scanning of the laser beam 11, and the laser beam 11 is moved in a sub scanning direction relative to the photosensitive drum 9, whereby a two-dimensional electrostatic latent image (hereinafter referred to as the "latent image") is formed on the photosensitive drum 9.

The laser beam 10 may not be converted to a collimated laser beam, but may be slightly broadened, and the imaging lens 6 may cause the laser beam 11 to form an image on the photosensitive drum 9. In this case, the locations of the collimator lens 2 and the imaging lens 6 are adjusted such that the laser beam 11 forms an image on the optical sensors 7 and 8 as well which are disposed at respective locations outside opposite ends of the photosensitive drum 9.

The laser beam 11 is irradiated onto the photosensitive drum 9, and part of the laser beam 10 is reflected by the half mirror 3, and enters a mode hop detection unit 13 as a laser beam 12. The mode hop detection unit 13 detects an increase in the amount of laser beam at the time of occurrence of a mode hop using the diffraction of light. The configuration of the mode hop detection unit 13 will be described hereinafter. A sensor signal 14 output from the optical sensor 7 disposed at a location close to the image writing start position, a sensor signal 15 output from the optical sensor 8 disposed at a location close to the image writing end position, and a mode hop detection signal 16 are input to the correction calculation section 17.

Figure 2:
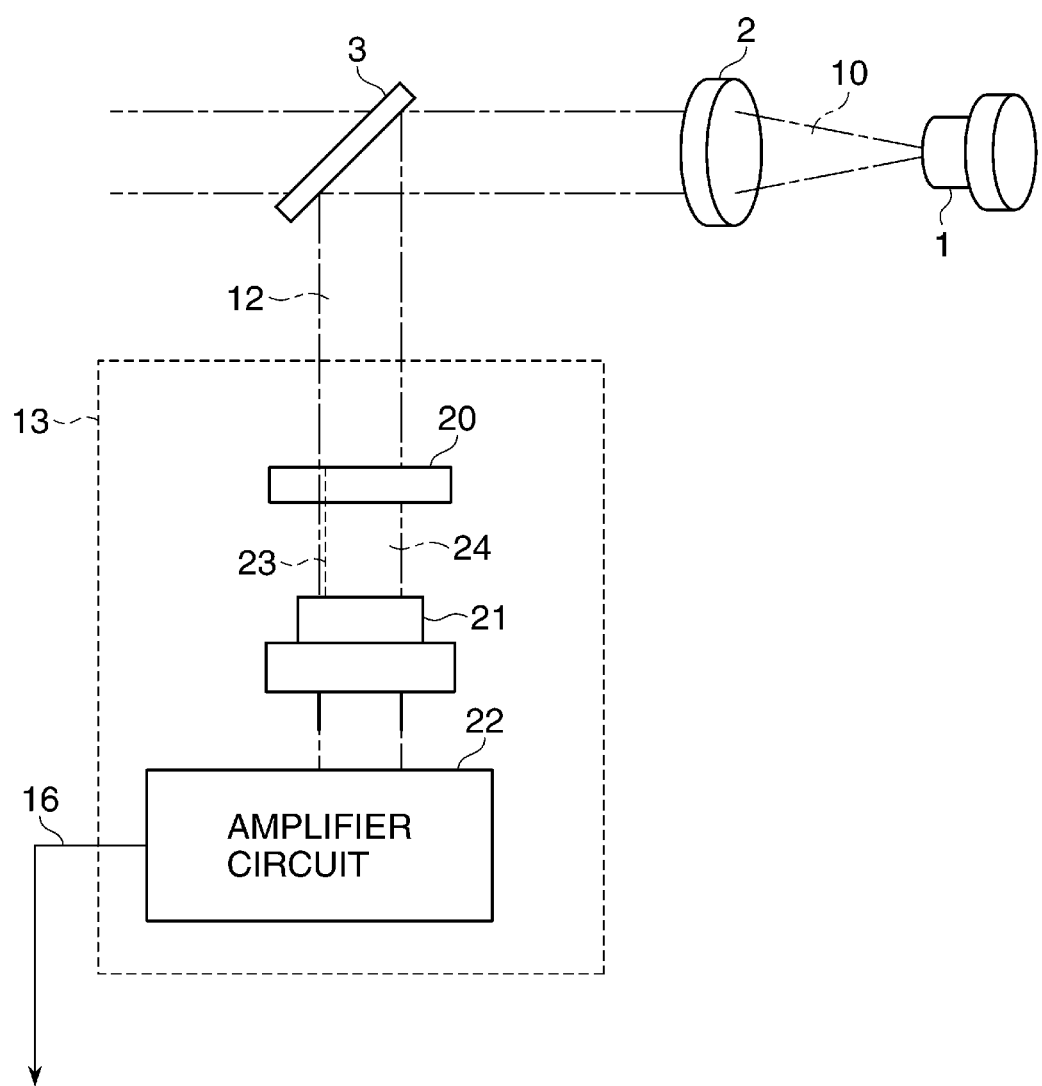
FIG. 2 is a schematic view of a mode hop detection unit appearing in FIG. 1.

FIG. 2 is a schematic view of the mode hop detection unit 13. In FIG. 2, the same components as described with reference to FIG. 1 are denoted by the same reference numerals. The mode hop detection unit 13 comprises a plane-parallel plate 20, a photodiode optical sensor 21, and an amplifier circuit 22 that amplifies outputs from the optical sensors 7 and 8.

The laser beam 12 is obtained by reflecting the laser beam 10 by the half mirror 3, and is irradiated toward the optical sensor 21. Laser beams received by the optical sensor 21 include a laser beam 24 which reaches the optical sensor 21 through the plane-parallel plate 20, and a laser beam 23 which reaches the optical sensor after being reflected by upper and lower surfaces of the plane-parallel plate 20 at least once. These laser beams 23 and 24 are displaced from each other in wavelength phase, and are received by the optical sensor 21 as interference light beams.

When wavelength variation is caused by mode hopping, the wavelength phase is necessarily displaced, and hence if a mode hop occurs in a single-mode laser beam, the interference light beams received by the optical sensor 21 change. The mode hop detection unit 13 amplifies the amount of change in the interference light beams by the amplifier circuit 22, and outputs a binarized signal as the mode hop detection signal 16.

Figure 3:
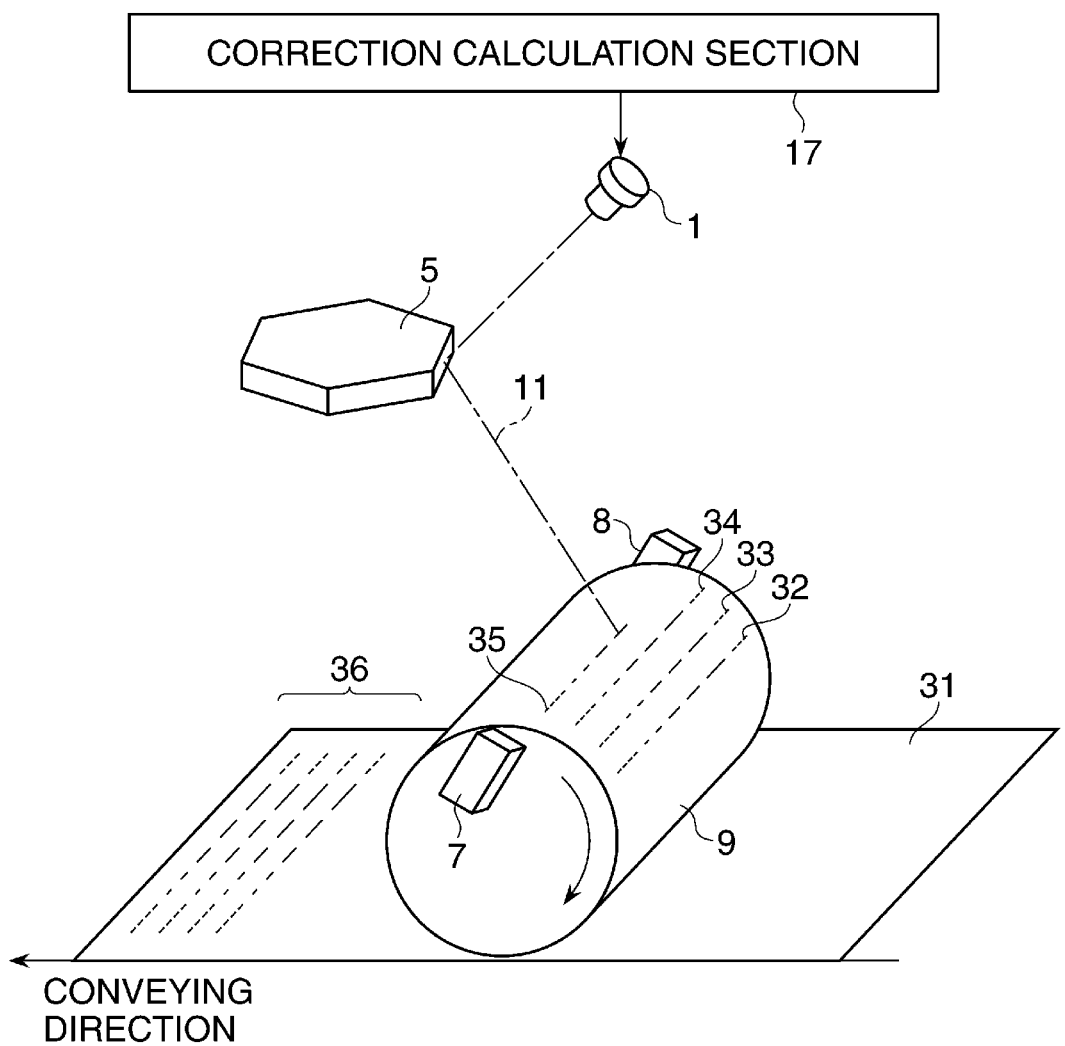
FIG. 3 is a schematic view showing a relationship between image writing on a photosensitive drum by a laser beam and an image formed by the image writing, as presented in the image forming apparatus shown in FIG. 1.

FIG. 3 is a schematic view showing a relationship between image writing on the photosensitive drum 9 by the laser beam 11 and an image formed by the image writing. In FIG. 3, the same components as described with reference to FIG. 1 are denoted by the same reference numerals. The laser light source 1, the polygon mirror 5, the photosensitive drum 9, and the correction calculation section 17 are substantially arranged as illustrated in FIG. 3, and a sheet 31 as a recording member is conveyed from a right side toward a left side, as viewed in FIG. 3, such that it is brought into contact with the photosensitive drum 9.

The polygon mirror 5 rotates at a substantially fixed speed, and irradiates the laser beam 11 onto the photosensitive drum 9 with reference to a time point when the laser beam 11 passes the optical sensor 7. As a result, a latent image is formed on the photosensitive drum 9. FIG. 3 shows the following state of image formation on the photosensitive drum 9: Assuming that one surface of the polygon mirror 5 is referred to as an n surface, and that an electrostatic latent image 32 is formed by irradiation from an n−3 surface, a latent image 33 is formed irradiation from an n−2 surface, a latent image 34 is formed from an n−1 surface, and a latent image 35 is formed by irradiation from the n surface halfway in an axial direction (main scanning direction) of the photosensitive drum 9.

Thus, the latent images are continuously formed on the photosensitive drum 9, a toner image is formed by developing the formed latent images by a development unit (not shown), and the formed toner image is transferred onto the sheet 31, whereby an image 36 is formed on the sheet 31.

Figure 4:
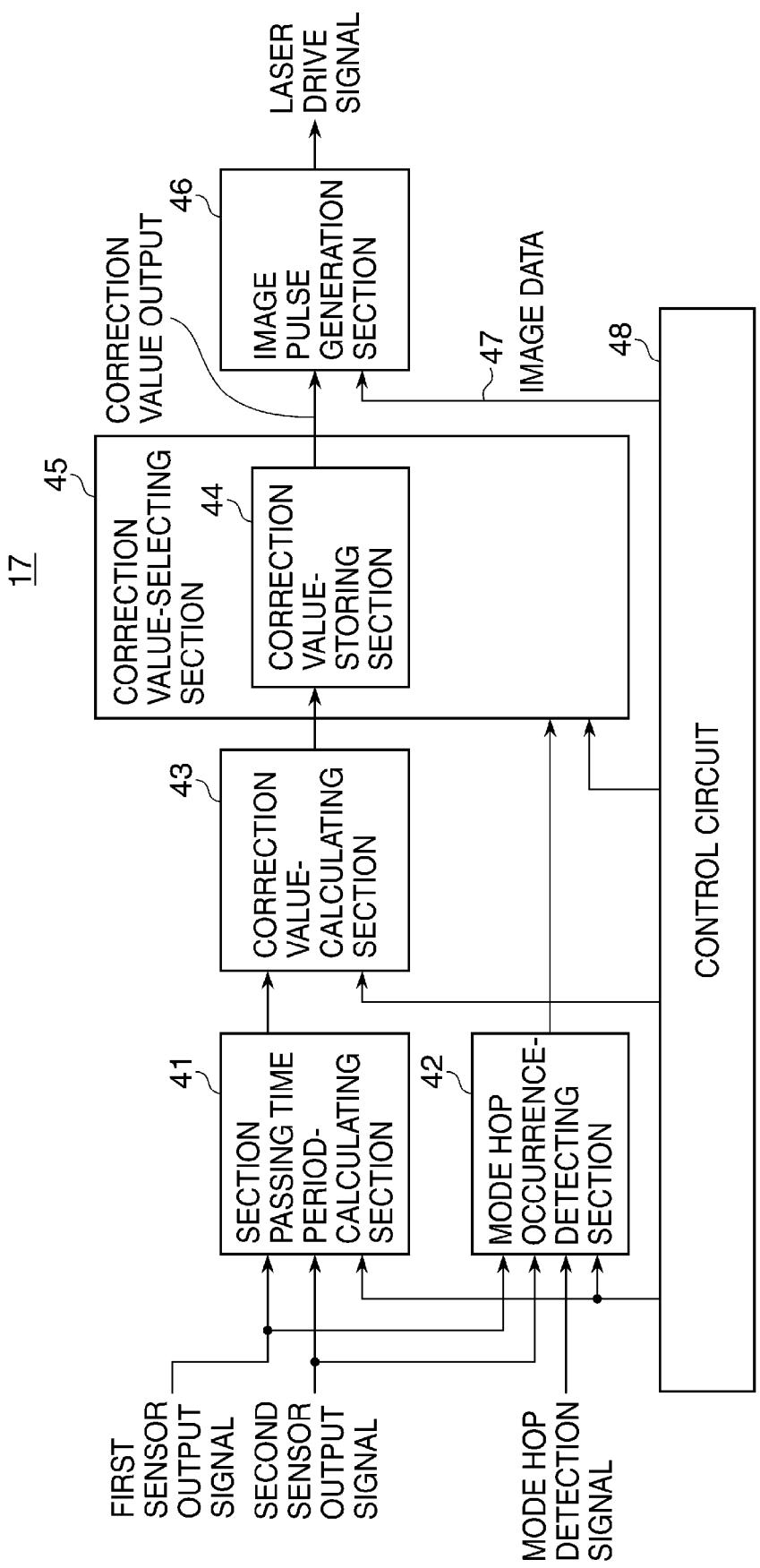
FIG. 4 is a block diagram of a correction calculation section appearing in FIG. 1.

FIG. 4 is a block diagram of the correction calculation section 17. The correction calculation section 17 comprises a section passing time period-calculating section 41, a mode hop occurrence-detecting section 42, a correction value-calculating section 43, a correction value-selecting section 45 including a correction value-storing section 44, an image pulse generation section 46, and a control circuit 48.

A first sensor output signal appearing in FIG. 4 is the sensor signal 14 output from the optical sensor 7 disposed at the location close to the image writing start position, appearing in FIG. 1, and a second sensor output signal is the sensor signal 15 output from the optical sensor 8 disposed at the location close to the image writing end position. The first sensor output signal and the second sensor output signal are input to the section passing time period-calculating section 41. The section passing time period-calculating section 41 measures a time period over which the laser beam 11 passes between the two optical sensors 7 and 8, (hereinafter referred to as the "section passing time period"), and outputs the measured section passing time period (hereinafter referred to as the "passing time period measurement value") to the correction value-calculating section 43.

The first sensor output signal, the second sensor output signal, and the mode hop detection signal are input to the mode hop occurrence-detecting section 42. The mode hop occurrence-detecting section 42 detects whether or not a mode hop occurs during time periods when the laser beam 11 is irradiated to the optical sensors 7 and 8, respectively, (hereinafter referred to as the "sensor detection time periods"), and outputs a result of detection to the correction value-selecting section 45. Note that the sensor detection time periods are also time periods during which the first sensor output signal and the second sensor output signal are output, respectively.

The correction value-calculating section 43 calculates a correction value for correcting a main scanning magnification (magnification of an image or an electrostatic latent image in the main scanning direction) (hereinafter referred to as the "correction value") based on the passing time period measurement value acquired from the section passing time period-calculating section 41. This correction value is calculated by the equation of "correction value=passing time period measurement value/reference value" using a reference value set in advance or a reference value calculated by a toner image measurement section (not shown). The calculated correction value is delivered to and written into the correction value-storing section 44 as correction data.

The correction value-selecting section 45 selectively reads out one of correction values stored in the correction value-storing section 44, which is to be output to the image pulse generation section 46, while taking into account a signal out from the mode hop occurrence-detecting section 42, which is indicative of whether or not a mode hop has occurred. A method of selecting a correction value will be described hereinafter.

The image pulse generation section 46 detects a main scanning magnification, and corrects the detected main scanning magnification based on the correction value (correction data) received from the correction value-selecting section 45. More specifically, the image pulse generation section 46 modulates an image clock signal (hereafter referred to as the "image CLK"). Further, the image pulse generation section 46 generates the laser drive signal 18 (see FIG. 1) from the modulated image CLK and image data 47 received from the control circuit 48, and delivers the generated laser drive signal 18 to the laser light source 1. The control circuit 48 adjusts operation timing of each of the processing sections appearing in FIG. 4, and outputs the image data 47 to the image pulse generation section 46.

FIG. 5 is a timing diagram useful in explaining a main scanning magnification correction process executed by the correction calculation section 17. Upon occurrence of a rising edge 51 of the first sensor output signal which is the output signal from the optical sensor 7, the section passing time period-calculating section 41 starts counting of the section passing time period. Further, upon occurrence of a rising edge 52 of the second sensor output signal which is the output signal from the optical sensor 8, the section passing time period-calculating section 41 terminates counting of the section passing time period, and calculates a passing time period measurement value for a measurement section [A]. The section passing time period-calculating section 41 calculates respective passing time period measurement values of a measurement section [B], a measurement section [C], a measurement section [D], and a measurement section [E], according to the rising edge 51 of the first sensor output signal and the rising edge 52 of the second sensor output signal, which occur alternately.

After occurrence of the rising edge 52 of the second sensor output signal, the correction value-calculating section 43 performs correction value calculation processing 53 using the passing time period measurement value in the measurement section [A] to thereby calculate a correction value. The calculated correction value is output to and written into the correction value-storing section 44 (image CLK modulation register) as a correction value 54. In FIG. 5, writing of this correction value is omitted.

The passing time period measurement value in the measurement section [A] is an accurately measured value as described hereinafter, the correction value-selecting section 45 selectively reads out the correction value 54 stored in the correction value-storing section 44, and delivers the correction value 54 to the image pulse generation section 46. The image pulse generation section 46 changes an image CLK 71 to an image CLK 72 using the received correction value 54, and image drawing on the photosensitive drum 9 is performed with the main scanning magnification corrected by the image CLK 72, whereby a latent image is formed.

The correction value calculation processing 53 is similarly performed on the passing time period measurement values in the measurement sections [B] to [E], and the correction values obtained as the calculation results are written into the correction value-storing section 44. In the present embodiment, the passing time period measurement value in the measurement section [B] is not an accurately measured value as described hereinafter, and hence the correction value calculated using the passing time period measurement value in the measuring section [B] is not selected by the correction value-selecting section 45. The correction value-selecting section 45 selects the correction value 54 which is the immediately preceding correction value, and outputs the correction value 54 to the image pulse generation section 46 again. Accordingly, the image CLK 72 is not changed, so that image drawing is performed using the image CLK 72. Note that the immediately preceding correction value is required to be a correction value calculated based on an accurately measured passing time period measurement value, and the "immediately preceding value" means a value immediately preceding a latest correction value (including the case of a latest correction value which is not accurately measured).

The correction value-selecting section 45 may be configured to input no correction value to the image pulse generation section 46 again instead of outputting the correction value 54 to the image pulse generation section 46 again. In this case, the image pulse generation section 46 continuously uses the latest correction value 54 having been received, which brings about a state in which the image CLK 72 is not changed.

Image data 61 is output to the laser light source 1 as a laser drive signal 58. Laser ON signals 59 and 60 in the laser drive signal 58, appearing in FIG. 5, correspond to laser beams irradiated to the optical sensors 7 and 8 to obtain the first sensor output signal and the second sensor output signal, respectively. As described above, image drawing on the photosensitive drum 9 is performed while changing a correction value for each line for image formation, i.e. for each scanning cycle to thereby form a latent image.

In FIG. 5, a mode hop detection signal 62 has been generated during the sensor detection time period of the optical sensor 8 which detects the end of the measurement section [B]. In the present embodiment, if the mode hop detection signal 62 is detected during the sensor detection time periods, a correction value calculated using the passing time period measurement value measured at the time is not used. This is because influence of displacement of pixel positions due to the mode hopping phenomenon is superimposed on a result of measurement in the measurement section [B], and hence the result of measurement contains an error and hence is not accurate.

For this reason, to continuously use the correction value 54 calculated based on the passing time period measurement value in the measurement section [A], the correction value-selecting section 45 outputs the correction value 54 stored in the correction value-storing section 44 to the image pulse generation section 46 again. This causes the image pulse generation section 46 to continuously use the image CLK 72, which makes it possible to perform correction while reducing the adverse influence of mode hopping.

The section passing time period in the measurement section [C] has been accurately measured, and hence a correction value 56 is calculated using the passing time period measurement value, and is stored in the correction value-storing section 44. The correction value 56 is output to the image pulse generation section 46, and the image CLK 72 is changed to an image CLK 74. Further, the section passing time period in the measurement section [D] has been also accurately measured, a correction value 57 is calculated using the passing time period measurement value, and is stored in the correction value-storing section 44. The correction value 57 is output to the image pulse generation section 46, and the image CLK 74 is changed to an image CLK 75.

Although in the present embodiment, as described above, the respective rising edges 51 and 52 of the first sensor output signal and the second sensor output signal are used for the measurement of the section passing time period, there may be used respective falling edges of the first sensor output signal and the second sensor output signal for the measurement, or the section passing time period may be set to an average value of a measured value of the section passing time period defined between the above-mentioned rising edges and a measured value of the section passing time period defined between the above-mentioned falling edges.

Figure 6A:
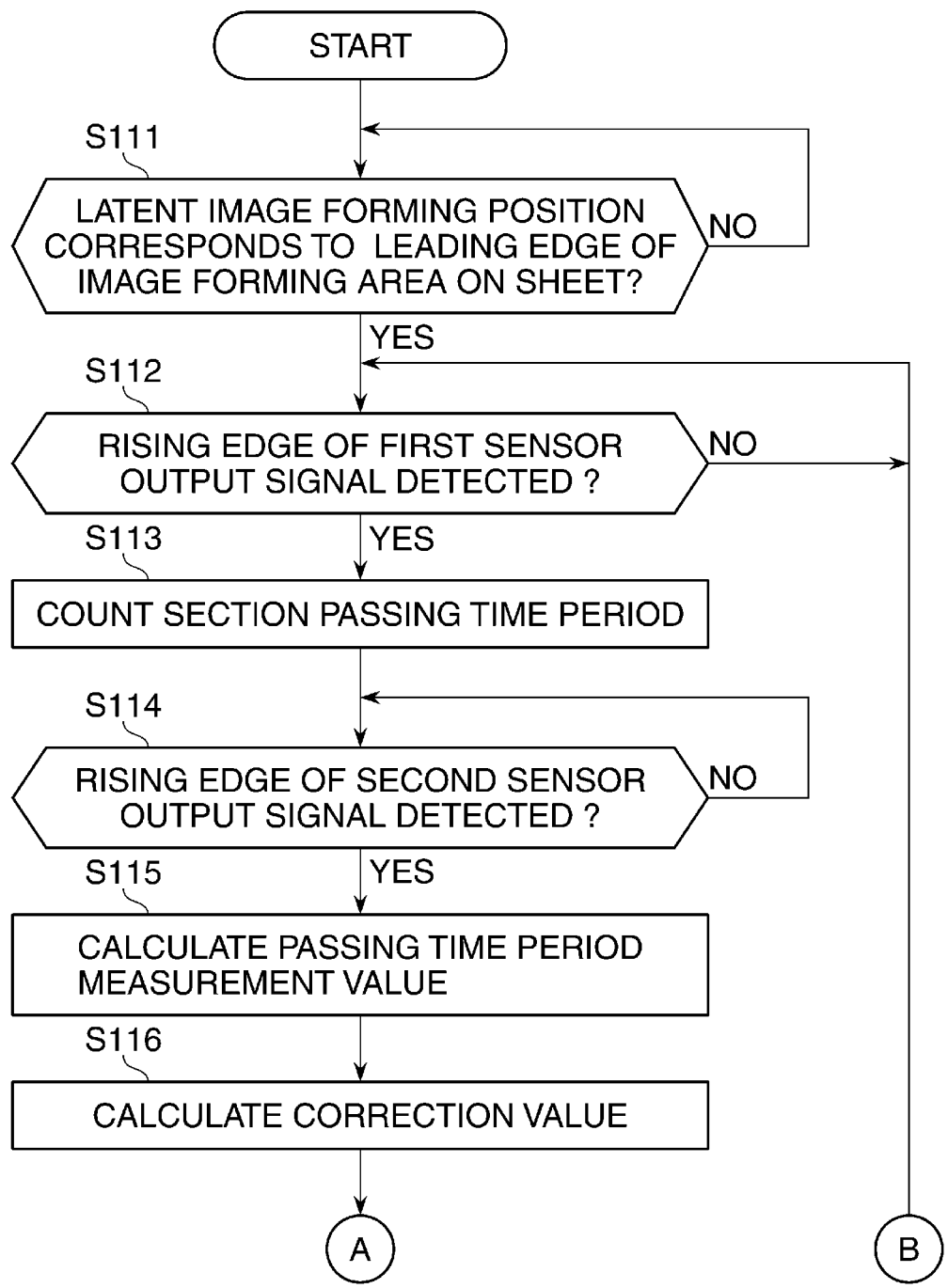
FIGS. 6A and 6B are a flowchart of the main scanning magnification correction process executed by the correction calculation section shown in FIG. 4.
Figure 6B:
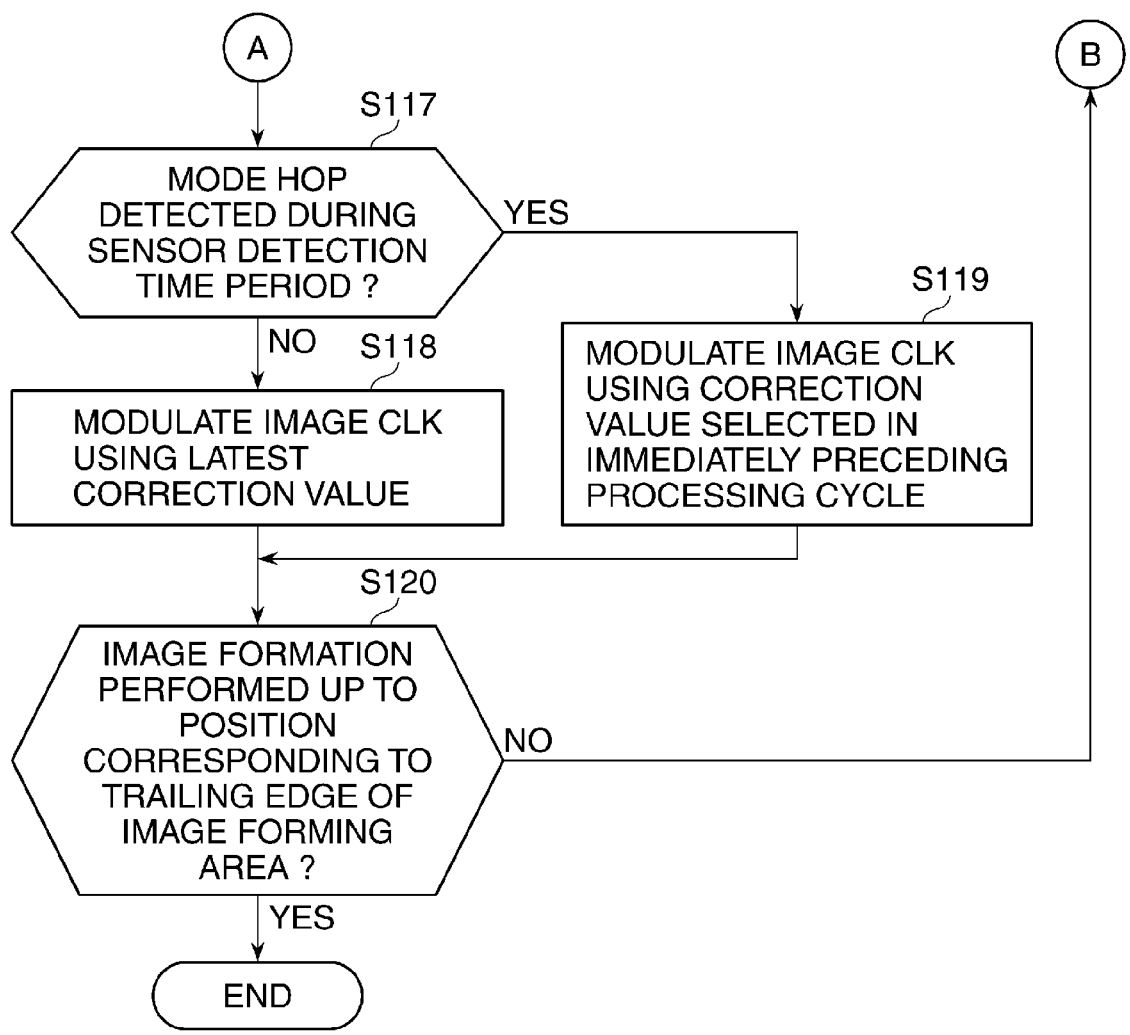

FIGS. 6A and 6B are a flowchart of the main scanning magnification correction process, described with reference to FIG. 5, and shows a process of correction of the main scanning magnification for one sheet, by way of example. When printing is started, the control circuit 48 determines whether or not an irradiation position on the photosensitive drum 9 to which the laser beam 11 is irradiated is a latent image formation position corresponding to a leading edge of an image forming area on a sheet (step S111). If the irradiation position is not the latent image formation position corresponding to the leading edge of the image forming area on the sheet (NO to the step S111), the control circuit 48 waits until the irradiation position is shifted to the latent image formation position corresponding to the leading edge of the image forming area on the sheet. If the irradiation position has been shifted to the latent image formation position corresponding to the leading edge of the image forming area on the sheet (YES to the step S111), the section passing time period-calculating section 41 determines whether or not a rising edge of the first sensor output signal has been detected (step S112).

The section passing time period-calculating section 41 waits until a rising edge of the first sensor output signal has been detected (NO to the step S112). If a rising edge of the first sensor output signal has been detected (YES to the step S112), the section passing time period-calculating section 41 starts counting of the section passing time period (step S113), and determines whether or not a rising edge of the second sensor output signal has been detected (step S114).

The section passing time period-calculating section 41 continues counting of the section passing time period (step S114) until a rising edge of the second sensor output signal has been detected (NO to the step S114). If a rising edge of the second sensor output signal has been detected (YES to the step S114), the section passing time period-calculating section 41 calculates the value counted until then as a passing time period measurement value (step S115).

The correction value-calculating section 43 calculates a correction value of the main scanning magnification based on the passing time period measurement value calculated in the step S115 (step S116). Next, to determine whether or not to actually cause the correction value calculated in the step S115 to be reflected on the image drawing, the correction value-selecting section 45 determines whether or not mode hop occurrence-detecting section 42 has detected a mode hop during the sensor detection time periods (step S117).

If a mode hop has not been detected (NO to the step S117), the correction value-selecting section 45 reads out a latest correction value (calculated in the immediately preceding step S116) stored in the correction value-storing section 44, and outputs the latest correction value to the image pulse generation section 46. Then, the image pulse generation section 46 modulates the image CLK using the latest correction value (step S118), and performs image drawing. On the other hand, if a mode hop has been detected (YES to the step S117), the correction value-selecting section 45 does not output the latest correction value stored in the correction value-storing section 44 to the image pulse generation section 46. The correction value-selecting section 45 selects and reads out a correction value stored in the correction value-storing section 44 and actually selected and used in the immediately preceding processing cycle (used in the step S119 in the immediately preceding processing cycle in FIGS. 6A and 6B), and outputs the selected correction value to the image pulse generation section 46. The image pulse generation section 46 modulates the image CLK using the thus received correction value (step S119), and performs image drawing. This results in continuous use of the immediately preceding image CLK without being changed, for image drawing.

Image drawing for one line is completed by the step S118 or S119, and hence the control circuit 48 determines whether or not a sequence of processing from the step S112 to the step S118 or the step S112 to the step S119 has been repeated until image drawing reaches the trailing edge of the image forming area on the sheet (correction of the main scanning magnification has been performed for the whole of one sheet) (step S120). If the present sequence of processing has not been completed (NO to the step S120), the control circuit 48 returns the process to the step S112, whereas if the sequence of processing has been completed (YES to the step S120), the control circuit 48 terminates the present process.

FIGS. 7A to 7C are views showing examples of the image formed on the sheet, in which FIG. 7A shows an image formed when main scanning magnification correction is not performed, FIG. 7B shows an image formed when main scanning magnification correction is always performed irrespective of occurrence of a mod hop, and FIG. 7C shows an image formed while performing the main scanning magnification correction process according to the present embodiment, described with reference to the FIG. 5 timing diagram and the FIG. 6A-6B flowchart. Note that the examples shown in FIGS. 7A to 7C show latent images (toner images) on the photosensitive drum 9 in a state before being transferred onto the sheet.

FIG. 7A shows that differences in length are caused between the formed images due to jitter of a polygon motor which drives the polygon mirror 5, an error in the production accuracy of each polygon surface of the polygon mirror 5, or the like. The respective image writing start positions at the left ends of images 711 to 715 are aligned because writing of each image is started at the same timing according to the detection signal from the optical sensor 7. Therefore, it can be understood that the formed mages 711 to 715 are gradually increased in length, and hence the quality of the images is lowered.

FIG. 7B shows an image formed when in spite of occurrence of a mode hop during output of the second sensor output signal on the second line (measurement section [B]) (see FIG. 5, if necessary), correction of the main scanning magnification is performed using the passing time period measurement value in the measurement section [B], and then image 173 drawing on the third line is performed. In this case, although images 721, 722, 724, and 725, corresponding to the first, second, fourth, and fifth lines, respectively, are properly corrected, an image 723 on the third line is largely displaced from the other images. Note that FIG. 7B shows an example in which the main scanning magnification is reduced.

FIG. 7C shows, as in the case of FIG. 5, an image formed when because of occurrence of a mode hop during output of the second sensor output signal on the second line (measurement section [B]), correction is performed using the correction value for the second line, which is the correction value used in the immediately preceding processing cycle, as a correction value for the third line. It is understood that in this case, an image 733 on the third line has an error smaller than that in the image 723 on the third line in FIG. 7B. Note that images 731, 732, 734, and 735, corresponding to the first, second, fourth, and fifth lines, respectively, are properly corrected.

It has been confirmed that by correcting the main scanning magnification as described in the present embodiment, it is possible to obtain an advantageous effect that compared with a standard deviation of the variation of images in the case of FIG. 7A, the standard deviation in the case of FIG. 7C is reduced to ⅓. In the case of FIG. 7B in which mode hopping is not taken into consideration, the image quality is largely reduced, compared with the case of FIG. 7A, and for example, when a mode hop occurs, the standard deviation of the variation of images is increased by approximately several times.

As described above, in the present embodiment, in the method of correcting the main scanning magnification by measuring the section passing time period over which the laser beam passes between the optical sensors 7 and 8 for each line (scanning cycle) of image (latent image) formation, when occurrence of a mode hop is detected during the sensor detection time periods, a correction value calculated using the passing time period measurement value of the line (scanning cycle) is not used. This makes it possible to improve accuracy of correction, and form a high-grade image.

Figure 8:
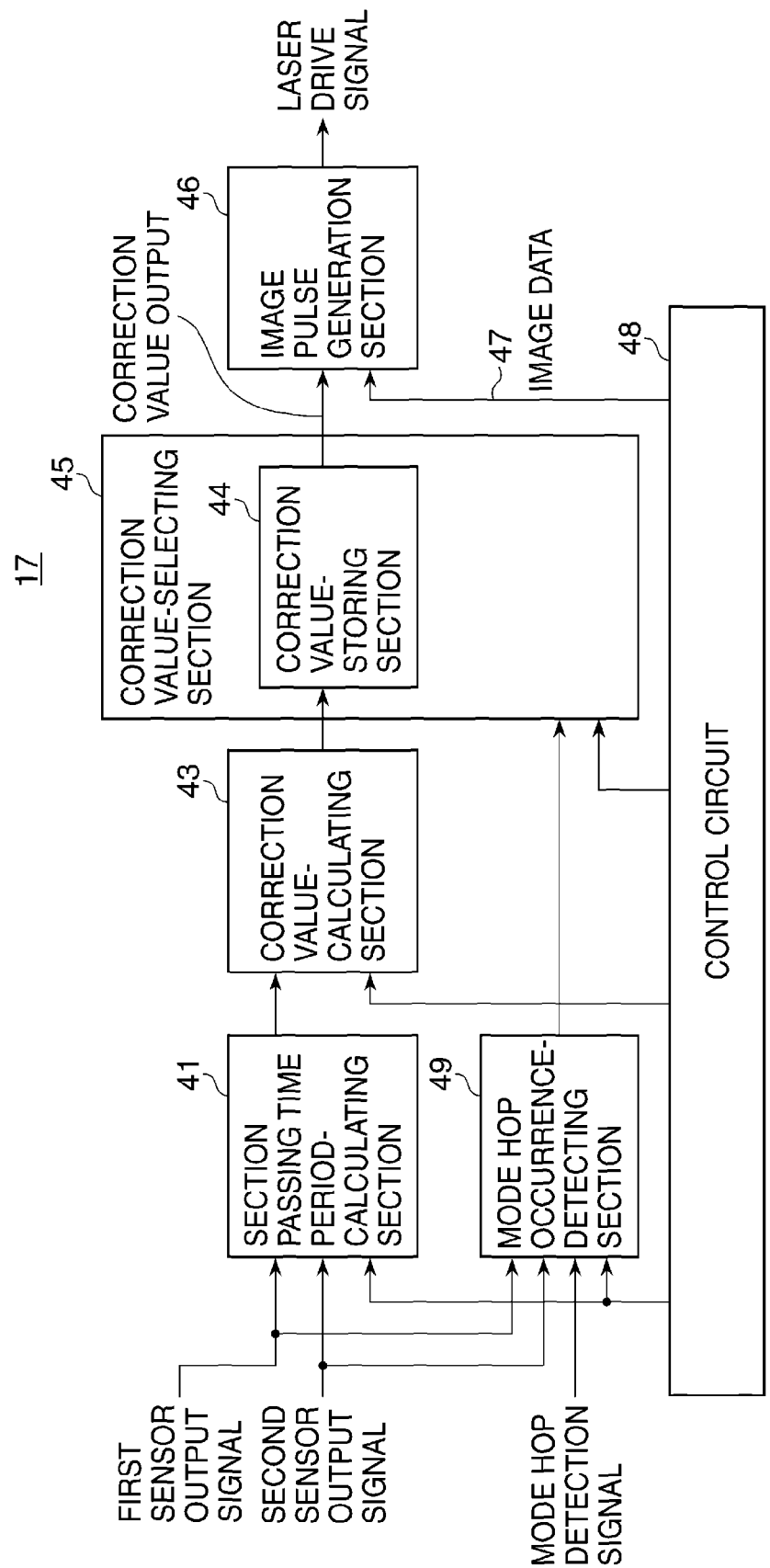
FIG. 8 is a block diagram of a correction calculation section of an image forming apparatus according to a second embodiment.

Next, a second embodiment of the present invention will be described with reference to FIGS. 8 and 9. The second embodiment is distinguished from the first embodiment in the configuration of the correction calculation section 17, and accordingly is different in details of the correction calculation processing due to the difference in the configuration of the correction calculation section 17. FIG. 8 is a block diagram of the correction calculation section 17 included in an image forming apparatus according to the second embodiment. In FIG. 8, the same components as those of the correction calculation section 17 of the image forming apparatus according to the first embodiment are denoted by the same reference numerals, and description thereof is omitted.

In the first embodiment, when the mode hop occurrence-detecting section 42 has detected occurrence of a mode hop during sensor detection, a correction value calculated based on the corresponding passing time period measurement value is not used, but a correction value used in the immediately preceding processing cycle is used. As is distinct therefrom, in the second embodiment, when a mode hop occurrence-detecting section 49 detects occurrence of a mode hop during an image formation time period, a correction value calculated based on the corresponding passing time period measurement value is not used, but a correction value used in the immediately preceding processing cycle is continuously used. Note that the "image formation time period" is intended to mean a section indicated by the image data 61 appearing in FIG. 5 and FIG. 9, referred to hereinafter, and is associated with a section during which part of the laser drive signal 58 corresponding to the image data 61 is output.

Similarly to the first embodiment, the first sensor output signal and the second sensor output signal are input to the section passing time period-calculating section 41 whereby the section passing time period over which the laser beam passes between the optical sensors 7 and 8 is measured. Further, the calculation of a correction value, the storage of the calculated correction value, and the modulation of the image CLK are sequentially performed to thereby output the laser drive signal 18. The mode hop occurrence-detecting section 49 determines an image formation time period based on the first sensor output signal and the second sensor output signal, and if a mode hop occurs during the image formation time period, a correction value calculated based on the corresponding passing time period measurement value is not used. This causes the image pulse generation section 46 to continuously use the image CLK based on the correction value used in the immediately preceding processing cycle.

Figure 9:
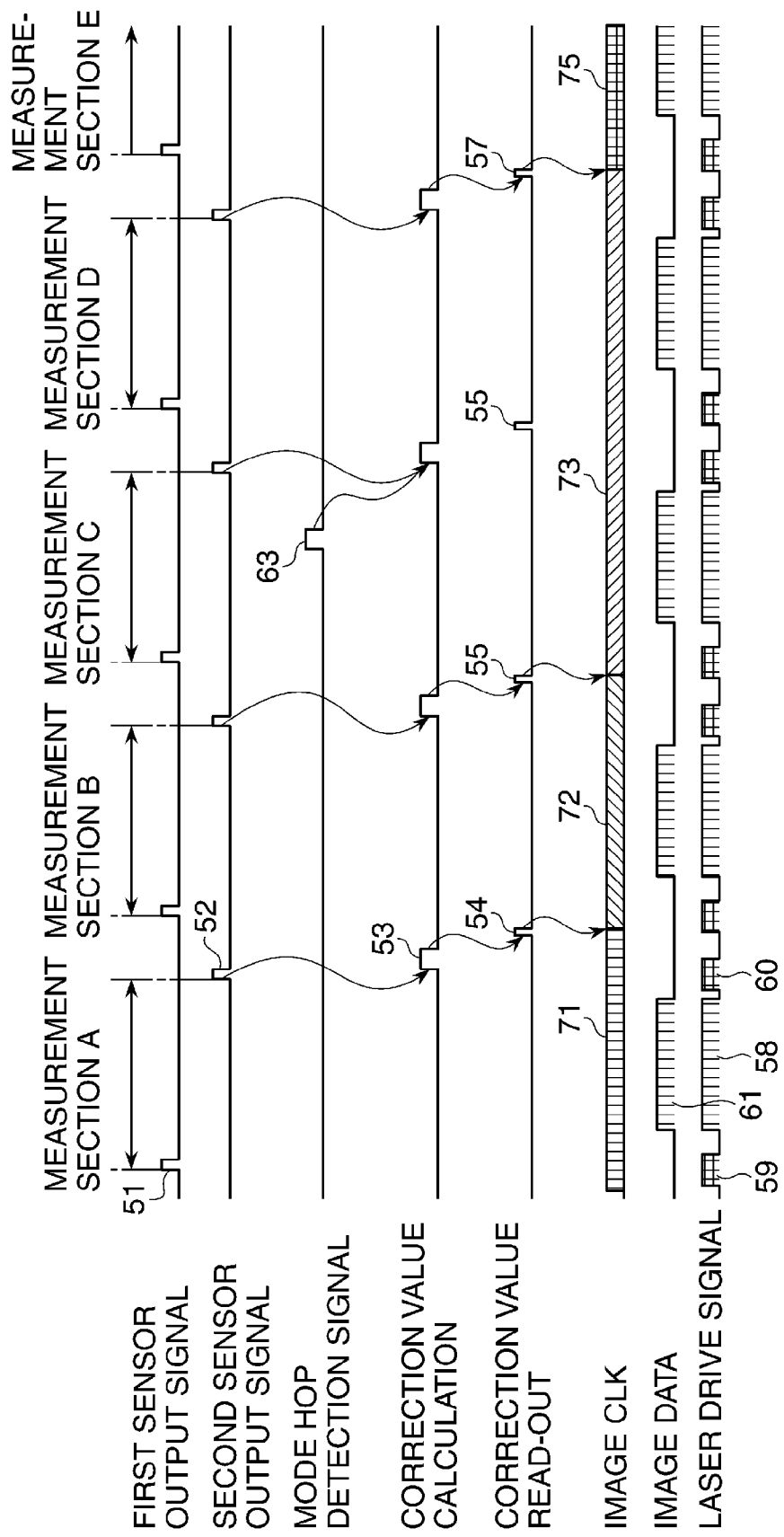
FIG. 9 is a timing diagram of a main scanning magnification correction process executed by the correction calculation section shown in FIG. 8.

FIG. 9 is a timing diagram of a main scanning magnification correction process executed by the correction calculation section shown in FIG. 8, and the same components as those in FIG. 5 are denoted by the same reference numerals. FIG. 9 shows a case where a mode hop detection signal 63 is generated during an image formation time period corresponding to the measurement section [C]. In this case, it is judged that the passing time period measurement value in the measurement section [C] contains an error, so that a correction value based on this data is not used, but the correction value 55 based on the passing time period measurement value in the measurement section [B] as the correction value used in the immediately preceding processing cycle is continuously used. As a result, an image CLK 73 is continuously used for image drawing. This makes it possible to improve the accuracy of correction of the main scanning magnification and form a high-grade image, similarly to the first embodiment.

Figure 10:
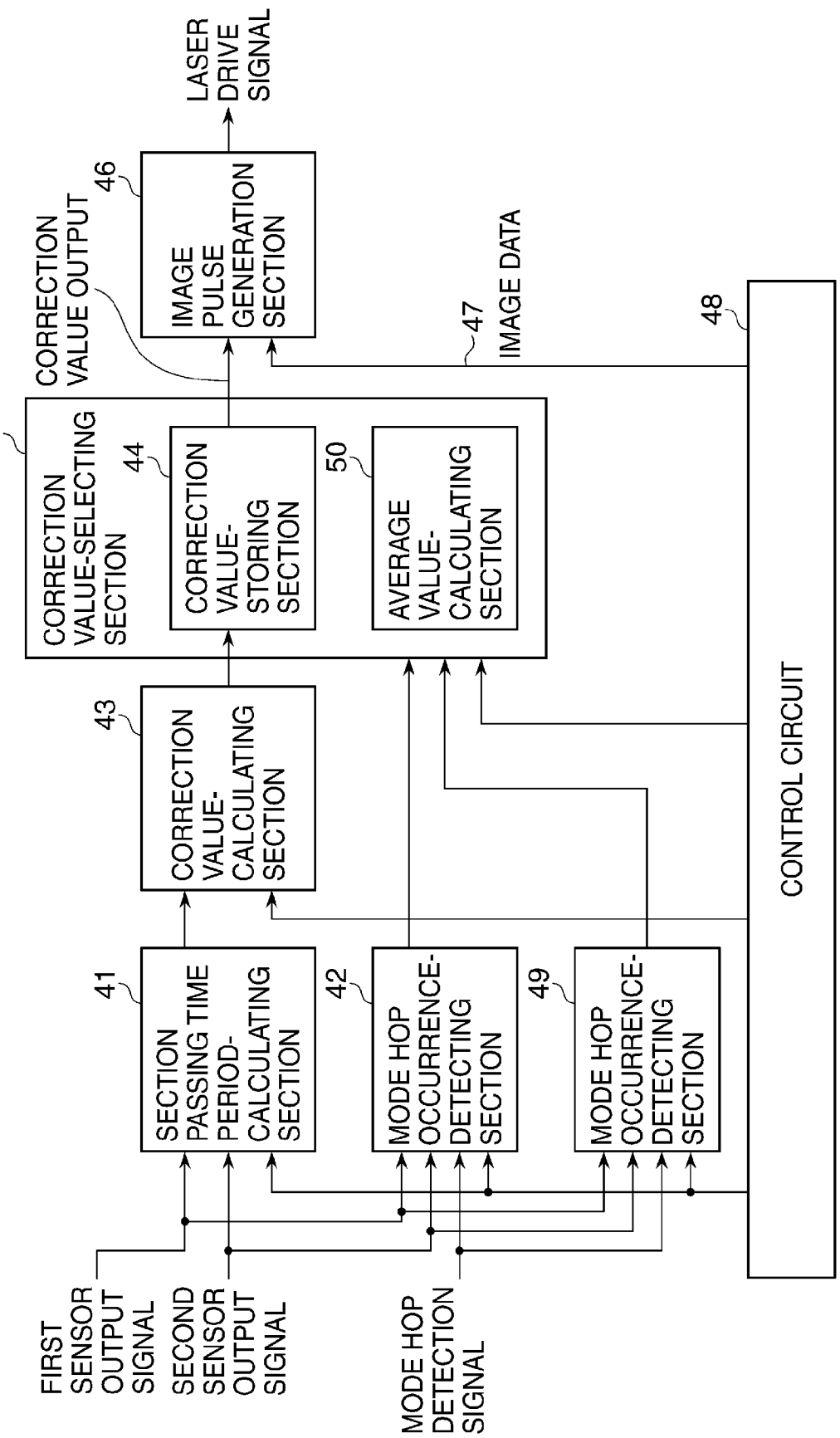
FIG. 10 is a block diagram of a correction calculation section of an image forming apparatus according to a third embodiment.

Next, a description will be given of a third embodiment with reference to FIGS. 10 to 12. In the third embodiment, the correction of the main scanning magnification is executed in a case where a mode hop has occurred during the sensor detection time periods and a mode hop has occurred during the image formation time period as well. FIG. 10 is a block diagram of the correction calculation section 17 included in an image forming apparatus according to the third embodiment. In FIG. 10, the same components as those of the correction calculation section 17 of the image forming apparatus according to the first embodiment and that of the image forming apparatus according to the second embodiment are denoted by the same reference numerals, and description thereof is omitted. As shown in FIG. 10, the correction calculation section 17 in the present embodiment includes both of the mode hop occurrence-detecting section 42 in the first embodiment and the mode hop occurrence-detecting section 49 in the second embodiment. Further, the correction value-selecting section 45 in the present embodiment includes an average value-calculating section 50 that calculates an average value of correction values by performing moving-averaging on the correction values stored in the correction value-storing section 44 (hereinafter referred to as the "moving average value"), and stores the calculated moving average value in the correction value-storing section 44.

Note that only correction values which are calculated using accurately measured passing time period measurement values are used for the calculation of the moving average value. The moving average value is not particularly limited, and for example, a simple moving average value, a weighted moving average value (linear weighted moving average value), or the like can be used as the moving average value.

FIG. 11 is a timing diagram of a main scanning magnification correction process executed by the correction calculation section included in an image forming apparatus according to the third embodiment. The mode hop detection signal 62 is generated during output of the second sensor output signal of the measurement section [B], a mode hop detection signal 64 is generated during output of the first sensor output signal of the measurement section [C], and the mode hop detection signal 63 is generated during the image formation time period in the measurement section [C]. As mentioned above, in the present embodiment, mode hopping occurs at a plurality of times close to each other.

The section passing time period is measured without a problem with respect to the measurement section [A]. Therefore, the calculation of the correction value on which the passing time period measurement value is reflected is performed, and the modulation from the image CLK 71 to the image CLK 72 is performed. However, the section passing time period is not accurately measured with respect to either of the measurement sections [B] and [C], and hence the correction value calculated using the passing time period measurement value in the measurement section [B] is not reflected, but the immediately preceding correction value 54 is continuously used, which results in continuous use of the image CLK 72. Further, in the present embodiment, for the correction value associated with the measurement section [C], the correction value-selecting section 45 selects a moving average value 80 stored in the correction value-storing section 44, and outputs the moving average value 80 to the image pulse generation section 46. As a result, the image pulse generation section 46 performs modulation from the image CLK 72 to an image CLK 76.

The moving average value 80 is used for the following reason: If mode hopping occurs in succession with a relatively high frequency, the immediately preceding correction value sometimes cannot be used. In this case, even when the immediately preceding correction value is a correction value which has been accurately acquired, if a correction value which has been stored too long before then (too old one) is used, this produces little effect of the correction. This problem can be overcome by using the moving average value.

The application of the moving average value is not limited to the example of that in the present embodiment, but the moving average value may be used by setting a predetermined reference value for a whole length of successive measurement sections over which the section passing time period cannot be accurately measured due to continuous occurrence of mode hopping, and determining whether the whole length of the successive measurement sections is longer than the predetermined reference value. In this case, so long as the whole length of the successive measurement sections is not longer than the predetermined reference value, the correction value used in the immediately preceding processing cycle is continuously used.

If the number of data items (number of measurement sections) used for calculation of the moving average value is set to a smaller value such that the data is extracted from relatively later measurement sections on a time-series basis, this makes it possible to obtain an effect closer to the effect obtained when the correction value used in the immediately preceding processing cycle is used. On the other hand, if the number of data items is increased, it is possible to calculate the correction value in a manner responsive to not only occurrence of mode hopping but also an average value of periodic variations caused by variation in the rotation of the polygon motor and the like. Taking such conditions into account, for example, it is possible to experimentally or empirically determine the number of data items used for calculation of the moving average value such that optimum image formation is performed.

Figure 12A:
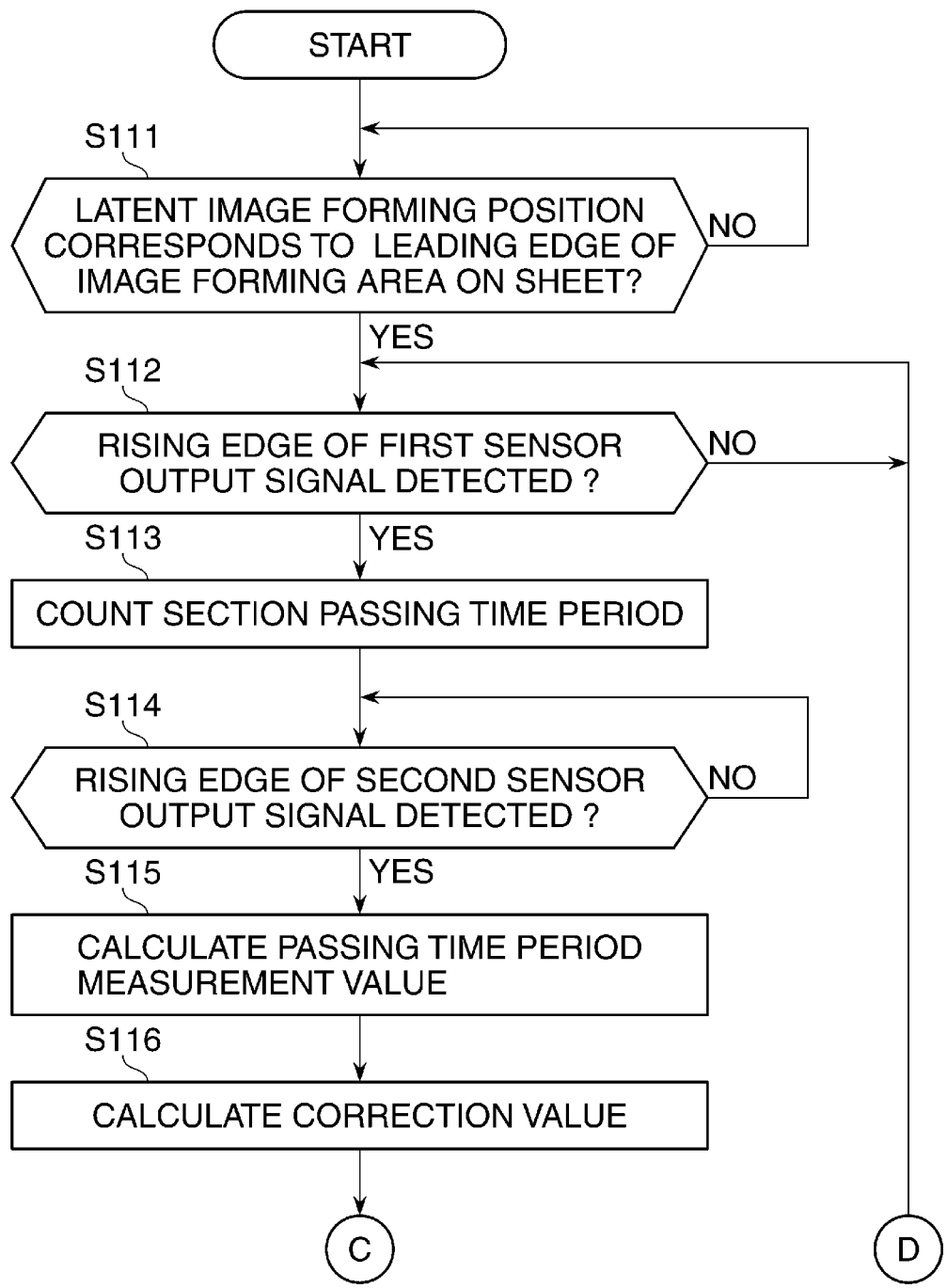
FIGS. 12A and 12B are a flowchart of the main scanning magnification correction process executed by the correction calculation section shown in FIG. 10.
Figure 12B:
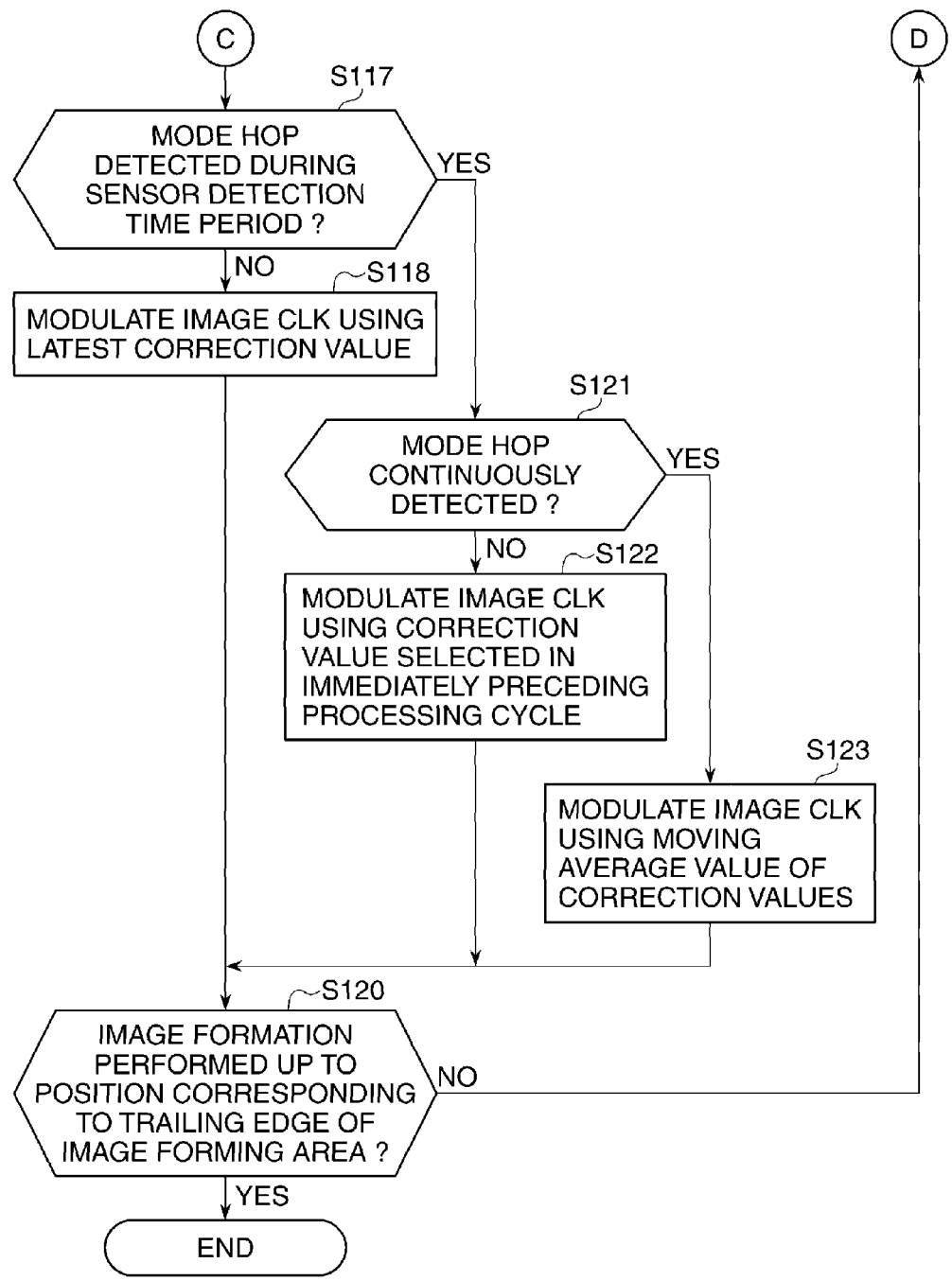
Figure 13:
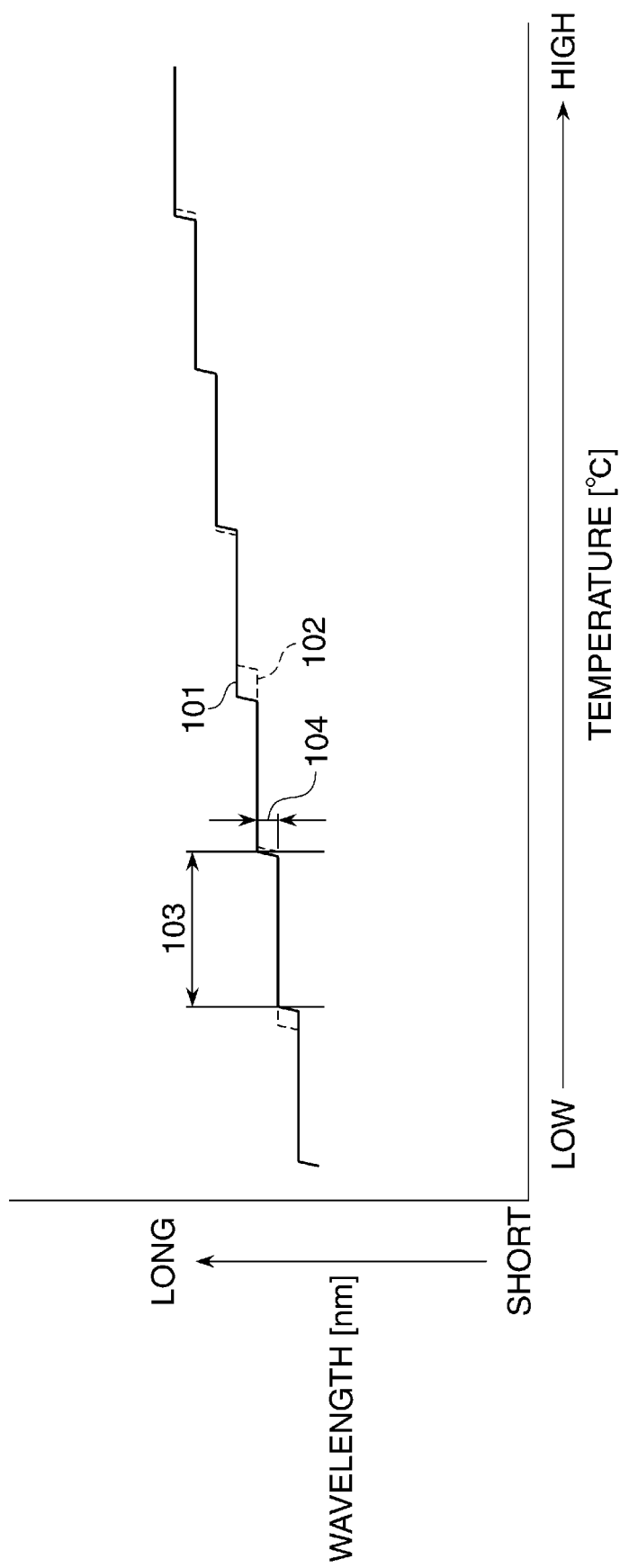
FIG. 13 is a diagram showing an example of changes in wavelength of the laser beam due to the mode hopping phenomenon.
Figure 14:
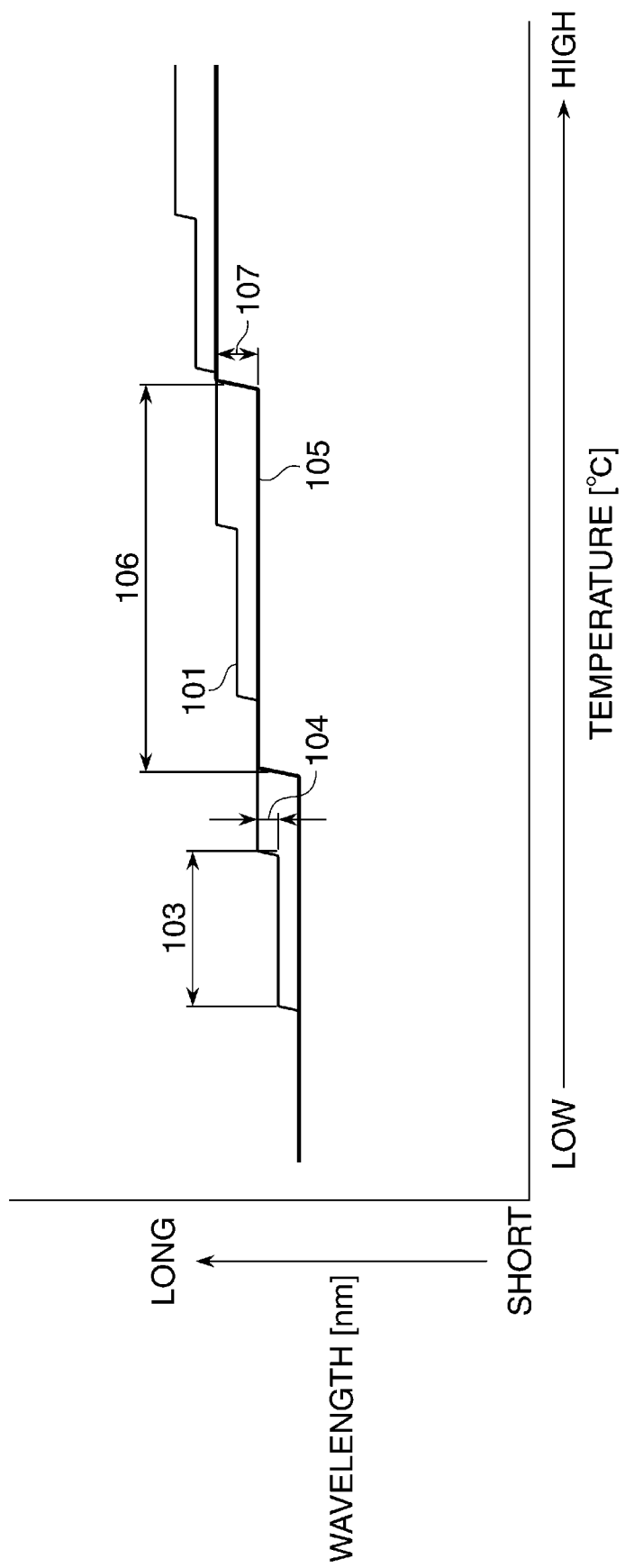
FIG. 14 is a diagram showing another example of changes in wavelength of the laser beam due to the mode hopping phenomenon.

FIGS. 12A and 12B are a flowchart of the main scanning magnification correction process executed by the correction calculation section 17 shown in FIG. 10. After printing is started, the measurement of the section passing time period over which the laser beam passes between the optical sensors 7 and 8, and the calculation of the correction value are performed, and it is determined whether or not a mode hop has been detected during the sensor detection time periods of the first sensor output signal and the second sensor output signal (steps S111 to S117). The steps S111 to S117 are the same as the steps S111 to S117 in FIGS. 6A and 6B, and hence detailed description thereof is omitted.

If the answer to the question of the step S117 is negative (NO), i.e. if a mode hop has not been detected, the image pulse generation section 46 modulates the image CLK using a latest correction value stored in the correction value-storing section 44 (step S118), and performs image drawing. On the other hand, if the answer to the question of the step S117 is affirmative (YES), i.e. if a mode hop has been detected, the correction value-selecting section 45 determines whether or not a mode hop has been continuously detected (step S121).

If a mode hop has not been continuously detected (NO to the step S121), the correction value-selecting section 45 selects a correction value stored in the correction value-storing section 44 and selected and used in the immediately preceding processing cycle, and outputs the same to the image pulse generation section 46. The image pulse generation section 46 modulates the image CLK using the thus selected correction value (step S122), and performs image drawing. If a mode hop has been continuously detected longer than the aforementioned predetermined reference value (YES to the step S121), the correction value-selecting section 45 selects the moving average value stored in the correction value-storing section 44, and outputs the same to the image pulse generation section 46. The image pulse generation section 46 modulates the image CLK using the moving average value (step S123), and performs image drawing. After execution of the step S118, S122, or S123, the control circuit 48 proceeds to the step S120. The step S120 is the same as the step S120 in FIG. 6B.

As described above, also in the third embodiment, it is possible to improve the accuracy of correction and form a high-grade image, similarly to the first and second embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Further, the embodiments of the present invention are described only by way of example, and it is possible to combine the embodiments on an as needed basis.

In each of the embodiments, the timing of detecting a mode hop and the method of selecting the correction value are specified as a single combination. However, this is not limitative, but even when the main scanning magnification correction process is executed by replacing the method of correcting the main scanning magnification using the correction value selected in the immediately preceding processing cycle and that using the moving average value with each other, it is possible to perform appropriate image formation.

Further, although in the above-described embodiments, the optical sensors 7 and 8 are disposed at respective locations outside the opposite ends of the photosensitive drum 9, this is not limitative, but the optical sensors 7 and 8 are only required to be disposed such that they can detect the laser beam within a scanning range of the laser beam in the main scanning direction, including the length of the surface of the photosensitive drum 9 which the laser beam scans.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims the benefit of Japanese Patent Application No. 2011-142801, filed Jun. 28, 2011, which is hereby incorporated by reference herein in its entirety.

What is claimed is:

1. An image forming apparatus that forms an image by developing an electrostatic latent image formed on a surface of a photosensitive member, comprising:

a laser light source configured to emit a laser beam for forming the electrostatic latent image;

a separation unit configured to separate the laser beam emitted from the laser light source into a plurality of laser beams including at least a first laser beam and a second laser beam;

a scanning unit configured to deflect the first laser beam separated by the separation unit such that a laser beam corresponding to that emitted from the laser light source scans the photosensitive member;

a lens configured to guide the first laser beam deflected by the scanning unit onto the photosensitive member;

a detection unit configured to detect occurrence of wavelength variation of the second laser beam separated by the separation unit, wherein the second laser beam is different from the first laser beam deflected by the scanning unit;

a magnification detection unit configured to detect a magnification of the electrostatic latent image in a direction of scanning of the first laser beam on the photosensitive member deflected by the scanning unit, the electrostatic latent image being formed by scanning of the first laser beam on the photosensitive member deflected by the scanning unit; and a correction unit configured, in a case where the detection unit has detected the occurrence of wavelength variation of the second laser beam during a scanning cycle, to correct the magnification of the electrostatic latent in a scanning cycle next to the scanning cycle during which the occurrence of wavelength variation of the second laser beam has been detected, based on correction data of the magnification of the electrostatic latent in a scanning cycle during which no occurrence of wavelength variation of the second laser beam has been detected and which is previous to the scanning cycle during which the occurrence of wavelength variation of the second laser beam has been detected, and, in a case where the detection unit has detected no occurrence of wavelength variation of the second laser beam during a scanning cycle, to correct the magnification of the electrostatic latent in a scanning cycle next to the scanning cycle during which no occurrence of wavelength variation of the second laser beam has been detected, based on correction data of the magnification of the electrostatic latent in the scanning cycle during which no occurrence of wavelength variation of the second laser beam has been detected.

2. The image forming apparatus according to claim 1, wherein the lens is an imaging lens for causing the first laser beam deflected by the scanning unit to scan the surface of the photosensitive member at a uniform speed, and the image forming apparatus further comprising:

two optical sensors configured to detect the first laser beam deflected by the scanning unit in a scanning range, the scanning range including a length of the photosensitive member in a main scanning direction in which the first laser beam scans the photosensitive member;

a calculation unit configured to measure an section passing time period over which the first laser beam deflected by the scanning unit passes between the two optical sensors, and calculate a correction value for correcting the magnification of the electrostatic latent based on the section passing time period;

a storage unit configured to store the correction value calculated by the calculation unit; and a correction value-selecting unit configured, in a case where the detection unit has detected no occurrence of wavelength variation of the second laser beam, to read out a latest correction value stored in the storage unit, and, in a case where the detection unit has detected the occurrence of the wavelength variation of the second laser beam, to selectively read out a correction value from correction values stored in the storage unit, and wherein the correction unit corrects the magnification of the electrostatic latent for a next scanning cycle using the correction value read out by the correction value-selecting unit.

3. The image forming apparatus according to claim 2, wherein the correction value-selecting unit reads out a latest correction value stored in the storage unit, in a case where the detection unit has detected no occurrence of wavelength variation of the second laser beam during a time period over which the first laser beam deflected by the scanning unit scans between the two optical sensors, and reads out a correction value stored in the storage unit and used most lately, in a case where the detection unit has detected the occurrence of wavelength variation of the second laser beam during the time period.

4. The image forming apparatus according to claim 2, wherein the correction value-selecting unit reads out a latest correction value stored in the storage unit, in a case where the detection unit has detected no occurrence of wavelength variation of the second laser beam during a time period over which at least one of the optical sensors receives the first laser beam deflected by the scanning unit, and reads out a correction value stored in the storage unit and used most lately, in a case where the detection unit has detected the occurrence of wavelength variation of the second laser beam during the time period.

5. The image forming apparatus according to claim 2, wherein the correction value-selecting unit reads out a latest correction value stored in the storage unit, in a case where the detection unit has detected no occurrence of wavelength variation of the second laser beam during an image forming time period over which the first laser beam deflected by the scanning unit scans the surface of the photosensitive member in the main scanning direction, and reads out a correction value stored in the storage unit and used most lately, in a case where the detection unit has detected the occurrence of wavelength variation of the second laser beam during the image forming time period.

6. The image forming apparatus according to claim 2, further comprising:

a determination unit configured to determine that the section passing time period is accurately measured in a case where the detection unit has detected no occurrence of wavelength variation of the second laser beam, and determine that the section passing time period is not accurately measured in a case where the detection unit has detected the occurrence of wavelength variation of the second laser beam; and an average value-calculating unit configured to calculate a moving average value of ones of the correction values stored in the storage unit, each one being calculated by the calculation unit based on the section passing time period determined by the determination unit that the section passing time period is accurately measured, and store the calculated moving average value in the storage unit, and wherein the correction value selectively read by the correction value-selecting unit includes the moving average value.

7. The image forming apparatus according to claim 6, wherein the correction value-selecting unit reads out a latest correction value stored in the storage unit, in a case where the detection unit has detected no occurrence of wavelength variation of the second laser beam during a time period over which the first laser beam deflected by the scanning unit scans between the two optical sensors, and reads out the moving average value stored in the storage unit, in a case where the detection unit has detected the occurrence of wavelength variation of the second laser beam during the time period.

8. The image forming apparatus according to claim 6, wherein the correction value-selecting unit reads out a latest correction value stored in the storage unit, in a case where the detection unit has detected no occurrence of wavelength variation of the second laser beam during a time period over which at least one of the optical sensors receives the first laser beam deflected by the scanning unit, and reads out the moving average value stored in the storage unit, in a case where the detection unit has detected the occurrence of wavelength variation of the second laser beam during the time period.

9. The image forming apparatus according to claim 6, wherein the correction value-selecting unit reads out a latest correction value stored in the storage unit, in a case where the detection unit has detected no occurrence of wavelength variation of the second laser beam during an image forming time period over which the first laser beam deflected by the scanning unit scans the surface of the photosensitive member in the main scanning direction, and reads out the moving average value stored in the storage unit, in a case where the detection unit has detected the occurrence of wavelength variation of the second laser beam during the image forming time period.

10. The image forming apparatus according to claim 1, wherein the light source is a semiconductor laser chip, and the wavelength variation is caused by mode hopping of the semiconductor laser chip.

* * * * *